3,452,569
HELICAL STRIP FORMING AND TAKEUP MEANS FOR THE ELECTRIC STATOR CORE
Terumoto Yamaguchi, Anjo-shi, Aichi-ken, Japan, assignor to Nippon Denso Kabushiki Kaisha, Aichi-ken, Japan
Filed Oct. 21, 1966, Ser. No. 588,558
Claims priority, application Japan, June 14, 1966, 41/38,400
Int. Cl. B21f 3/04
U.S. Cl. 72—145                    6 Claims

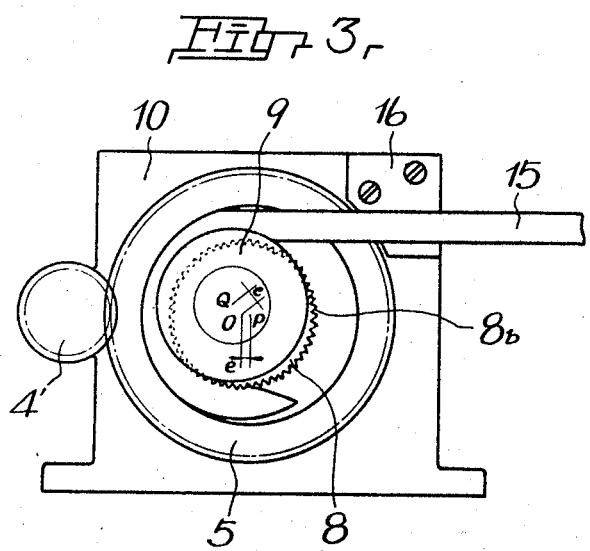

ABSTRACT OF THE DISCLOSURE

Briefly stated in accordance with one aspect of this invention, there is provided a helical strip forming and takeup means for making the stator core, comprising an axial forming mechanism and a radial forming mechanism. The axial forming mechanism comprises a pair of rotating surfaces which rotate while being in contact with the axial surfaces of the helical strip, respectively. The center of one of the pair is arranged eccentrically with respect to the center of the other of the pair. The helical strip is pressured under a predetermined pressure by one of the pair in the axial direction. The radial forming mechanism comprises a pair of rotating surfaces which rotate while being in contact with the radial surfaces of the helical strip, respectively. The center of one of the second named pair is arranged eccentrically with respect to the center of the other of the second named pair. The helical strip is pressured radially by the second named pair. At least one of the four rotating surfaces is driven positively while the other of the four surfaces are adapted to be rotated substantially synchronously with the last named surface, so as to drive the strip forcedly, whereby the strip is continuously plastically worked into a helix and helically taken up.

---

The present invention relates to a helical strip forming and takeup means for an electric stator core.

Heretofore, a stator core for use in an electric motor, generator, etc. is made by laminating annular sheets of metal which have been shaped from a flat sheet metal by punching using a press. An appreciably large amount of waste material corresponding to the center and margin of the core is brought forth by such a manner of producing the stator core so that the material is squandered extraordinarily. Meantime, it has been proposed to plastically work a strip of sheet metal into the annulus in a continuous manner. However, crumpling occurs along the inner periphery of the annulus due to the tension subjected to the radially outer side of the annulus and the compression subjected to the radially inner side thereof. In order to make such a helix from a straight strip without occurrence of a crumple, an apparatus for making the helix has been proposed, in which a straight strip is plastically worked into annuli and taken up helically on a take-up spindle in a continuous manner by means of forcedly transmitting a taking up power thereto while axially pressing it by an irrotational axially pressing plate provided with a hydraulic pressing cylinder and radially inwardly pressing it by a takeup roller provided with a knurl on its outer cylindrical surface. However, if the axial pressure is heightened for sure avoidance of crumples or if the production is intended to be heightened by speeding up the taking up, the seizure, a fatal defect in the method, would occur due to the extraordinarily large frictional heat generated between the irrotational axially pressing plate and the helix being taken up. In addition, practically speaking, a scratch is apt to occur on the axial surface of the helix due to powdery iron accidentally interposed between the irrotational pressing plate and the helix. In order to prevent the helix from the seizure, it has been proposed to use a large amount of a high grade heat resisting lubricant of which component is molybdenum bisulfide, however. it is very difficult to remove this lubricant from the resultant helix by washing so that many drawbacks are brought about by the remaining lubricant. For example, when such helices are to be integrated into a stator core by means of argon welding, satisfactory welding is disturbed by the remaining lubricant. When an insulating varnish is applied on the stator core, the adhesion of the varnish is made difficult and the resulting insulation is incomplete.

One object of this invention is to provide a means for making a stator core at high speed.

Another object of this invention is to provide a means for plastically working a straight strip into a helix not having a crumple and taking it up helically in a continuous manner at high speed without occurrence of seizure.

Still another object of this invention is to provide a means, in which an appreciable amount of frictional heat is not generated between a helix being formed and contacting surfaces.

Further another object of this invention is to provide a means whereby the helix produced is released from scratches.

A further object of this invention is to provide a means in which the material is never wasted.

Briefly stated in accordance with one aspect of this invention, there is provided a helical strip forming and take-up means for making the stator core, comprising an axial forming mechanism and a radial forming mechanism. The axial forming mechanism comprises a pair of rotating surfaces which rotate while being in contact with the axial surfaces of the helical strip, respectively. The center of one of the pair is arranged eccentrically with respect to the center of the other of the pair. The helical strip is pressured under a predetermined pressure by one of the pair in the axial direction. The radial forming mechanism comprises a pair of rotating surfaces which rotate while being in contact with the radial surfaces of the helical strip, respectively. The center of one of the second-named pair is arranged eccentrically with respect to the center of the other of the second-named pair. The helical strip is pressured radially by the second-named pair. At least one of the four rotating surfaces is driven positively while the other of the four surfaces are adapted to be rotated substantially synchronously with the last-named surface, so as to drive the strip forcedly, whereby the strip is continuously plastically worked into a helix and helically taken up.

During experiments for inventing the present means, done by me, I have found that it is enough to pressure the helical strip axially at the start during about one fourth of the starting turn of the radial forming operation in order to prevent in the helical strip the occurrence of crumples. In view of this, the arrangement of the axial forming mechanism has been invented.

The invention will be better understood and other objects and additional advantages of the invention will become apparent upon perusal of the following description taken in connection with the drawings, in which:

FIG. 3 is a front elevational view thereof.

Figure 1:
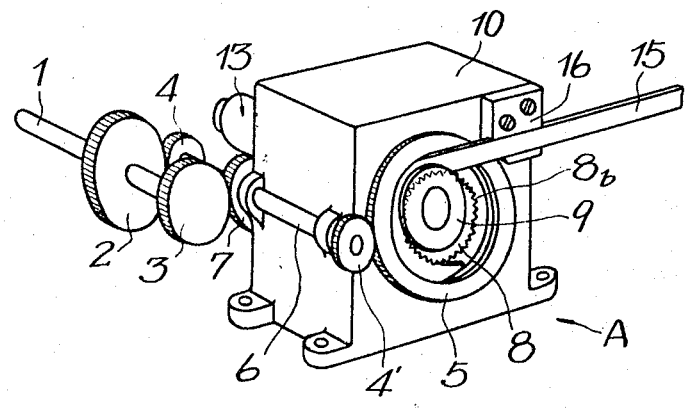
FIG. 1 is a perspective view of a helical strip forming and take-up means embodying this invention.
Figure 2:
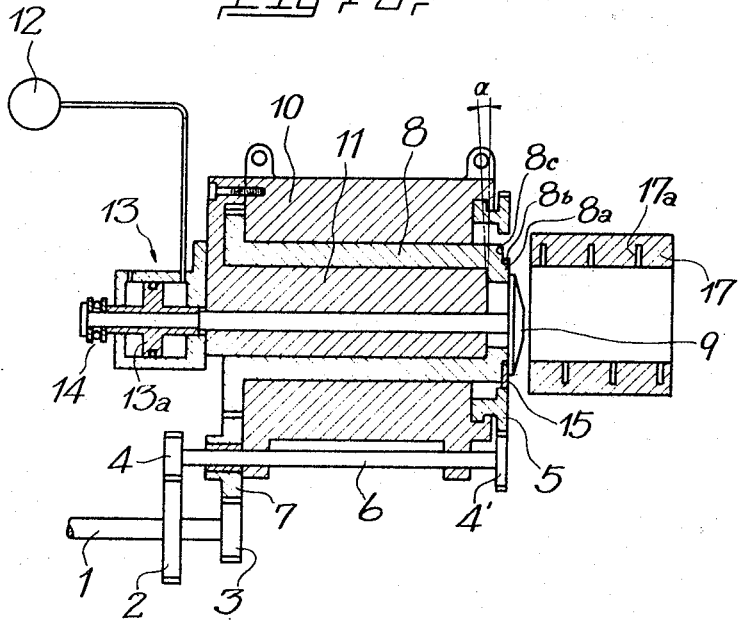
FIG. 2 is a cross sectional view thereof.

Referring more particularly to the drawings, the preferred embodiment of this invention will now be described; however, this description will be understood to be illustrative of the invention and not as limiting it to the particular construction shown and described. There is a main driving shaft 1 driven by a driving means such as an electric motor, not shown. Two driving gears 2 and 3 are fixedly mounted on the shaft 1.

A transmission gear 4 in mesh with the driving gear 2 is fixedly mounted on a transmission gear shaft 6 journalled in a body 10. Another transmission gear 4′ fixedly mounted on the transmission gear shaft 6 is in mesh with a toothed ring 5 adapted to be rotated on a front end of the body 10. An idle gear 7 freely mounted on the transmission gear shaft 6 is in mesh with the driving gear 3 and also with a take-up roller 8 so as to drive the takeup roller 8 from the main driving shaft 1. It is to be seen that the takeup roller 8 is rotated in the same direction with the toothed ring 5 and they are adapted to be rotated substantially synchronously with each other. The axis P of rotation of the toothed ring 5 is maintained horizontally spaced apart from the axis O of rotation of the takeup roller 8 by a distance of eccentricity $e$, to the right as shown in FIG. 3. A concentric step 8a is formed on the front surface of the takeup roller 8. Radially angular knurls 8b are provided on the radially peripheral surface of the step 8a. The inner periphery of the toothed ring 5 is maintained apart from the knurled outer peripheral surface 8b of the step 8a so as to institute a radial forming mechanism having a space for inserting an end of strip 15 therebetween and engaging it with the two.

A pressuring disc 9 is arranged in front of and in contact with the front end of the takeup roller 8. A shaft extending rearwardly from the pressuring disc 9 is rotatably journalled by an eccentric bearing 11 fixed to the body 10 and extending inside the takeup roller 8, and provided with a flange on its rearmost end. The flange is pressured by a piston 13a intermediate a thrust bearing 14. The piston 13a is adapted to be slid within a cylinder 13 connected with a hydraulic pump 12, so that the pressuring disc 9 is pulled towards the front end of the takeup roller 8. By virtue of the eccentric bearing 11, the pressuring disc 9 is arranged eccentrically with respect to the takeup roller 8. The axis Q of rotation of the pressuring disc 9 is kept apart by a distance of eccentricity $e'$ from the axis O of rotation of the takeup roller 8 at an upward angle with the horizontal line in the opposite direction to the axis P of rotation of the toothed ring 5, as shown in FIG. 3. By virtue of this arrangement of the pressuring disc 9, the helical strip 15 is prevented from having crumples formed therein during the starting for about one fourth of the starting turn of the helix forming operation and protrusion of the outer periphery of the helix beyond the step 8a of the takeup roller 8. Thus an annular surface 8c exteriorly of the step 8a of the front end of the takeup roller 8 and the rear surface of the pressuring disc 9 provide an axial forming mechanism.

In the operation of the present device, an end of a straight strip 15 of a sheet metal, in general, electric sheet, is inserted into a guiding member 16. After passing through the guiding member 16, the end of said strip is directed tangentially to and inserted into a part of an annular recess defined by the toothed ring 5, and the knurled step 8b and the annular surface 8c of the takeup roller 8. The motor, not shown, and the pump 12 are energized. The direction of the insertion of the strip 15 is the same as the direction of rotation of the takeup roller 8 and the toothed ring 5 so that the end of the strip 15 is easily and positively pressed by the radial forming mechanism. Just after the end of the strip 15 has been pressed by the radial forming mechanism, it is pressured axially by the pressuring disc 9. Thus pressured between the pressuring disc 9 and the annular surface 8c of the takeup roller 8, the helix being formed from the straight strip 15 is prevented from having the formation of any crumple or axial inflation therein. By virtue of the eccentric arrangement in the radial forming mechanism, the end of the strip 15 is pressed positively thereby and, by virtue of the eccentric arrangement in the axial forming mechanism, the starting about one fourth of the starting turn of deformation of the straight strip 15 into the helix, is particularly sufficiently prevented from such crumple forming tendency. After the starting one fourth turn, the helix is released from such tendency. But the balance of the periphery of the pressuring disc 9 serves to prevent the helix from any radially protruding tendency disengaging from the toothed ring 5. After the starting one turn, the end of the helical strip 15 is transferred to and inserted into a helical takeup groove 17a formed in the inner cylindrical surface of a stationary takeup sleeve 17.

In order to smooth the feed of the strip 15, it is preferred to arrange the toothed ring 5 for retaining the periphery in such a manner that the toothed ring 5 is inclined by an angle $\alpha$ to the axial end surface of the body 10. The axis P of rotation of the toothed ring 5 is out of parallel to the axis Q of rotation of the takeup roller 8. To the same end with the above, it is also preferred to arrange the axis Q of rotation of the pressuring disc 9 out of parallel to the axis O of rotation of the takeup roller 8 or rearwardly rightward down in FIG. 3. It is necessary, however, for such an arrangement of axis of rotation of the pressuring disc 9 to provide a convex rear surface of the pressuring disc 9.

In this embodiment, knurls 8b are formed on the radial surface of the step 8a of the takeup roller 8. Alternatively, knurls may be formed on the inner periphery of the toothed ring 5. Further, even if neither the toothed ring 5 nor the takeup roller 8 is provided with such knurls, it is easily possible to forcedly take up the strip 15.

In this embodiment, the pressuring disc 9 is not positively driven. However, it is possible to design a modification in which the pressuring disc 9 is driven positively. In short, it is important that at least one among the four of the toothed ring 5, the annular surface 8c and the knurled surface 8b of the step 8a of the takeup roller 8, and the pressuring disc 9 is positively driven and the others are synchronously rotated therewith.

In accordance with this invention, an easily available conventional lubricant may be used without probability of generation of frictional heat and occurrence of seizure even at an appreciable high speed.

While a particular embodiment of the invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of the invention.

What is claimed as new and desired to be secured by Letters Patent of the United States is:

1. A helical strip forming and takeup means for producing a stator core comprising a pair of opposing rotatably mounted surfaces with one of said surfaces being arranged within the other of said surfaces and having its axis of rotation eccentrically positioned with respect to the axis of rotation of the other of said surfaces, said pair of surfaces being positioned apart for receiving the strip therebetween and applying pressure radially thereto, a third rotatably mounted surface extending between said pair of surfaces, a fourth rotatably mounted surface extending in the same direction as said third surface and having its axis of rotation eccentrically positioned with respect to the axis of rotation of said third surface, said third and fourth surfaces capable of applying an axial pressure to the strip and means for rotating at least one of said strips whereby the strip can be continuously worked in a helix.

2. A helical strip forming and takeup means for producing a stator core as claimed in claim 1, wherein one of said pair of surfaces is the inner periphery of a ring, the other of said pair of surfaces is the radially peripheral surface of a step on a roller extending within said ring, said third surface is an end surface of said roller extending from said other surface of said pair of surfaces, and said fourth surface is a face of a disc extending alongside said roller end.

3. A helical strip forming and takeup means for producing a stator core as claimed in claim 2 including means for moving said disc towards said roller end.

4. A helical strip forming and takeup means for producing a stator core as claimed in claim 2 including means for rotating said ring and said roller in the same direction at the same time.

5. A helical strip forming and takeup means for producing a stator core as claimed in claim 1 in which at least one of said four rotating surfaces is a knurled surface for driving the strip.

6. A helical strip forming and takeup means for producing a stator core as claimed in claim 1, wherein said third surface is a plane surface and said fourth surface is convex.

References Cited

UNITED STATES PATENTS

| | | | |
|---|---|---|---|
| 1,970,536 | 8/1934 | Mansur | 72—145 X |
| 2,182,844 | 12/1939 | Grumbacher | 72—142 X |
| 2,398,172 | 4/1946 | Bruegger | 72—145 |
| 3,062,267 | 11/1962 | Hart et al. | 72—142 |

MILTON S. MEHR, *Primary Examiner.*